(12) United States Patent
Hashimoto

(10) Patent No.: US 8,996,859 B2
(45) Date of Patent: Mar. 31, 2015

(54) AUTHENTICATION SYSTEM, AUTHENTICATION METHOD AND COMPUTER READABLE MEDIUM

(75) Inventor: Sunao Hashimoto, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 612 days.

(21) Appl. No.: 12/698,333

(22) Filed: Feb. 2, 2010

(65) Prior Publication Data

US 2011/0035583 A1 Feb. 10, 2011

(30) Foreign Application Priority Data

Aug. 6, 2009 (JP) ................................. 2009-183076

(51) Int. Cl.
*H04L 29/06* (2006.01)
*G06F 21/62* (2013.01)
*G06F 3/12* (2006.01)
*G06F 21/34* (2013.01)
*G06F 21/60* (2013.01)

(52) U.S. Cl.
CPC .......... *G06F 21/6218* (2013.01); *G06F 3/1238* (2013.01); *G06F 21/34* (2013.01); *G06F 21/608* (2013.01); *G06F 2221/2117* (2013.01); *G06F 2221/2141* (2013.01); *G06F 2221/2151* (2013.01); *G06F 2221/2153* (2013.01)
USPC ............................................ 713/155; 726/18

(58) Field of Classification Search
CPC ................... G06F 21/30–21/31; G06F 21/34; G06F 21/36; G06F 21/40; G06F 21/45; G06F 21/608; G06F 21/62; G06F 21/6218; G06F 2221/2153; G06F 2221/2151; G06F 2221/2117; G06F 3/1238; H04L 9/32; H04L 9/3234; H04L 63/08; H04L 63/083; H04L 63/0853; H04L 63/10; G06K 15/4095
USPC ......... 713/150, 155, 168, 175–176, 179, 182, 713/185; 726/2, 16–21, 26–27, 28
See application file for complete search history.

(56) References Cited

U.S. PATENT DOCUMENTS

| 4,516,845 | A | * | 5/1985 | Blakely et al. ................. 396/332 |
| 5,380,047 | A | * | 1/1995 | Molee et al. .................... 283/86 |
| 5,505,494 | A | * | 4/1996 | Belluci et al. ................... 283/75 |
| 6,385,728 | B1 | * | 5/2002 | DeBry .............................. 726/9 |

(Continued)

FOREIGN PATENT DOCUMENTS

| CN | 1643471 A | 7/2005 |
| JP | 2003-228472 A | 8/2003 |

(Continued)

OTHER PUBLICATIONS

Office Action dated Aug. 6, 2013 issued by the Japanese Patent Office in counterpart Japanese Patent Application No. 2009-183076.

(Continued)

*Primary Examiner* — Saleh Najjar
*Assistant Examiner* — Eric W Shepperd
(74) *Attorney, Agent, or Firm* — Sughrue Mion, PLLC

(57) ABSTRACT

An authentication apparatus includes an accepting unit and an instructing unit. The accepting unit accepts a request, which requests to issue an authentication medium for a second user, from a first user who is authenticated. The instructing unit instructs to issue the authentication medium for the second user.

8 Claims, 10 Drawing Sheets

(56) References Cited

U.S. PATENT DOCUMENTS

| | | | | |
|---|---|---|---|---|
| 6,862,583 | B1* | 3/2005 | Mazzagatte et al. | 705/64 |
| 6,997,384 | B2* | 2/2006 | Hara | 235/454 |
| 7,146,159 | B1* | 12/2006 | Zhu | 455/414.1 |
| 7,290,146 | B2* | 10/2007 | Ekers et al. | 713/182 |
| 7,447,494 | B2* | 11/2008 | Law et al. | 455/410 |
| 7,821,390 | B2* | 10/2010 | Chikada et al. | 340/539.13 |
| 7,836,088 | B2* | 11/2010 | Chavda et al. | 707/795 |
| 8,037,308 | B2* | 10/2011 | Miyazawa | 713/175 |
| 8,060,449 | B1* | 11/2011 | Zhu | 705/75 |
| 8,060,830 | B2* | 11/2011 | Kahn et al. | 715/760 |
| 8,087,072 | B2* | 12/2011 | Gajjala et al. | 726/6 |
| 8,570,544 | B2* | 10/2013 | Jung | 358/1.14 |
| 2002/0080397 | A1* | 6/2002 | Igarashi et al. | 358/1.15 |
| 2002/0099794 | A1* | 7/2002 | Lue Chee Lip et al. | 709/218 |
| 2002/0128982 | A1* | 9/2002 | Gefwert et al. | 705/67 |
| 2002/0195487 | A1* | 12/2002 | Hosogoe | 235/380 |
| 2003/0093670 | A1* | 5/2003 | Matsubayashi et al. | 713/168 |
| 2003/0182587 | A1* | 9/2003 | Morrison et al. | 713/202 |
| 2004/0213612 | A1* | 10/2004 | Hanaoka | 400/62 |
| 2005/0183141 | A1* | 8/2005 | Sawada | 726/16 |
| 2006/0087410 | A1* | 4/2006 | Garcia et al. | 340/309.16 |
| 2006/0171535 | A1* | 8/2006 | Omae et al. | 380/201 |
| 2006/0222352 | A1* | 10/2006 | Kawase et al. | 396/15 |
| 2007/0064258 | A1* | 3/2007 | Silverbrook et al. | 358/1.15 |
| 2007/0067825 | A1* | 3/2007 | Lapstun et al. | 726/2 |
| 2007/0181664 | A1* | 8/2007 | Hatzav et al. | 235/375 |
| 2008/0094655 | A1* | 4/2008 | Nagai | 358/1.15 |
| 2009/0216859 | A1* | 8/2009 | Dolling | 709/218 |
| 2009/0268224 | A1* | 10/2009 | Takahashi | 358/1.14 |
| 2009/0276633 | A1* | 11/2009 | Silverbrook et al. | 713/176 |
| 2010/0161728 | A1* | 6/2010 | Drozt et al. | 709/204 |
| 2010/0290073 | A1* | 11/2010 | Nuggehalli et al. | 358/1.14 |
| 2011/0013219 | A1* | 1/2011 | Nuggehalli et al. | 358/1.15 |

FOREIGN PATENT DOCUMENTS

| | | |
|---|---|---|
| JP | 2004-13870 A | 1/2004 |
| JP | 2004276271 A | 10/2004 |
| JP | 2005-024817 A | 1/2005 |
| JP | 2006235757 A | 9/2006 |
| JP | 2009-87271 A | 4/2009 |

OTHER PUBLICATIONS

Office Action dated Sep. 18, 2013 issued by the State Intellectual Property Office of the People's Republic of China in counterpart Chinese Application No. 201010115964.2.

Office Action dated Apr. 10, 2014 issued by the State Intellectual Property Office of P.R.C. in counterpart Chinese Patent Application No. 201010115964.2.

* cited by examiner

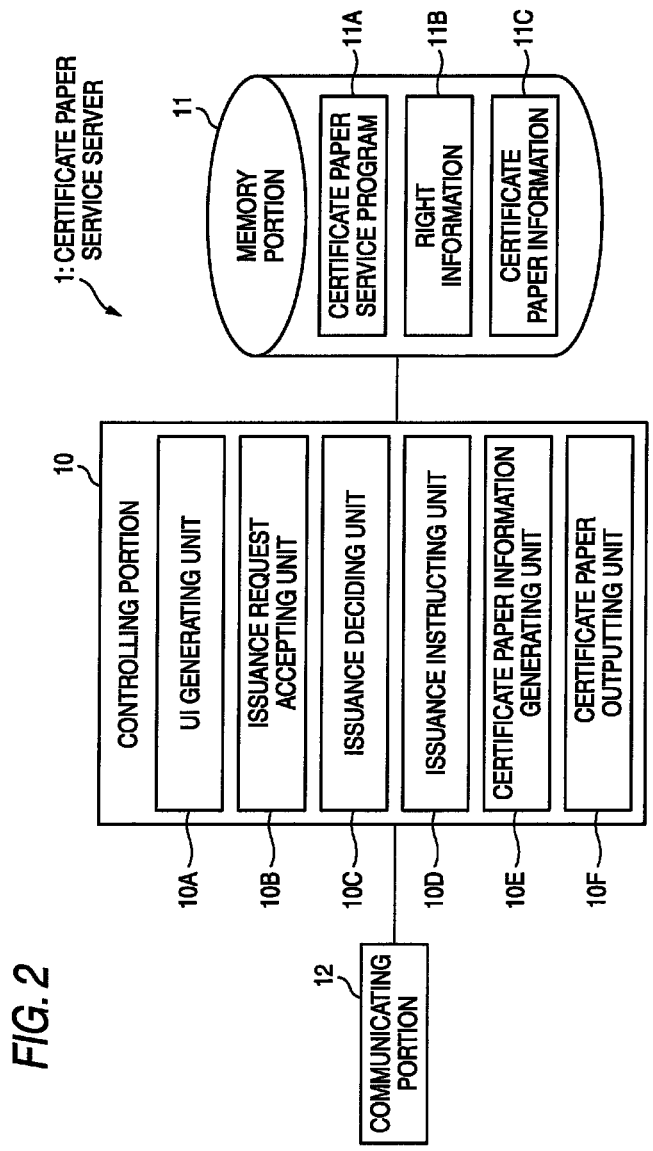

FIG. 3A

11B: RIGHT INFORMATION

| MULTIFUNCTION DEVICE | RIGHT |
|---|---|
| A | COPY, PRINT, SCAN |
| B | COPY, SCAN |
| ... | ... |

FIG. 3B

11C: CERTIFICATE PAPER INFORMATION

| CERTIFICATE PAPER PRINTING PERSON | CERTIFICATE PAPER USER | ID CODE | RIGHT | TERM |
|---|---|---|---|---|
| USER B | USER A | 1234567890 | COPY, PRINT | 08/2/23–09/2/28 |
| USER C | USER D | 0987654321 | COPY | 08/2/23 |
| ... | ... | ... | ... | ... |

FIG. 4A

20: USER INFORMATION

| ID | USER NAME |
|---|---|
| 12345 | USER B |
| 54321 | USER A |
| ⋮ | ⋮ |

FIG. 4B

21: ORGANIZATION INFORMATION

| PERSON IN RIGHT | USER NAME |
|---|---|
| USER B | USER A |
| USER C | ALL USERS |
| ⋮ | ⋮ |

FIG. 5

30: AUTHENTICATION CARD INFORMATION

| CARD ID | USER |
|---|---|
| 112233 | USER B |
| 556677 | USER C |
| ⋮ | ⋮ |

FIG. 6

40: PRINT JOB

| USER | PRINTED DOCUMENT |
|---|---|
| USER A | DOCUMENT A |
| USER A | DRAWING 01 |
| USER B | CERTIFICATE PAPER (USER A) |
| ⋮ | ⋮ |

FIG. 7A

CERTIFICATE PAPER ISSUANCE

NAME OF PERSON IN RIGHT: USER B

PASSWORD: ********

NEXT

FIG. 7B

PLEASE CHOOSE A CERTIFICATE PAPER USER
USER A ▼

PLEASE CHOOSE A RIGHT
☑ COPY  ☑ PRINT  ☐ SCAN

PLEASE INPUT A TERM
2009/2/23 ~ 2009/2/28

PRINT

AUTHENTICATION SYSTEM, AUTHENTICATION METHOD AND COMPUTER READABLE MEDIUM

CROSS-REFERENCE TO RELATED APPLICATIONS

This application is based on and claims priority under 35 USC 119 from Japanese Patent Application No. 2009-183076 filed on Aug. 6, 2009.

BACKGROUND

Technical Field

The present invention relates to an authentication apparatus, an authentication system, an authentication method and a computer readable medium.

SUMMARY

According to an aspect of the invention, an authentication apparatus includes an accepting unit and an instructing unit. The accepting unit accepts a request, which requests to issue an authentication medium for a second user, from a first user who is authenticated. The instructing unit instructs to issue the authentication medium for the second user.

BRIEF DESCRIPTION OF THE DRAWINGS

Exemplary embodiment (s) of the present invention will be described in detail based on the following figures, wherein:

FIG. 2 is a schematic view showing a configurative example of an authentication server according to the first exemplary embodiment of the present invention;

FIGS. 3A and 3B are schematic views showing an example of information that a certificate paper service server according to the first exemplary embodiment of the present invention stores;

FIGS. 4A and 4B are schematic views showing an example of information that an organization information management server according to the first exemplary embodiment of the present invention stores;

FIG. 5 is a schematic view showing an example of information that an authentication service server according to the first exemplary embodiment of the present invention stores;

FIG. 6 is a schematic view showing an example of information that a multifunction device according to the first exemplary embodiment of the present invention stores;

FIGS. 7A and 7B are schematic views showing an example of a certificate paper printing screen that is displayed on a terminal according to the first exemplary embodiment of the present invention;

DETAILED DESCRIPTION

First Exemplary Embodiment

Configuration of Authentication System

Figure 1:
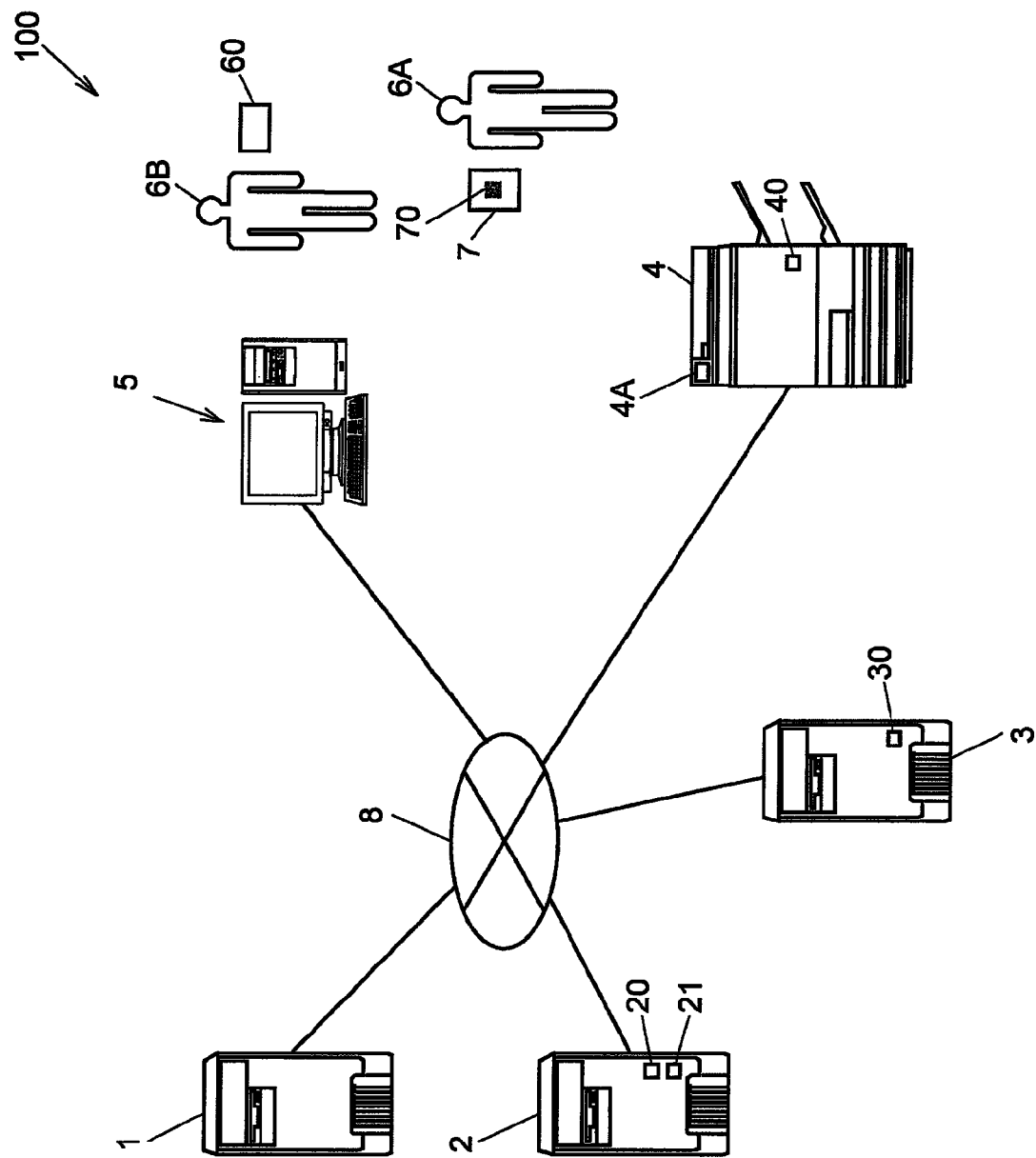
FIG. 1 is a schematic view showing a configurative example of an authentication system according to a first exemplary embodiment of the present invention.

FIG. 1 is a schematic view showing a configurative example of an authentication system according to a first exemplary embodiment of the present invention.

An authentication system 100 includes a certificate paper service server 1 as an authentication apparatus that generates information used to print a certificate paper 7, described later, as an authentication medium in response to a user's request, an organization information management server 2 for managing information showing a relation between user's information and a user, an authentication service server 3 for authenticating the use of a multifunction device 4 described later, a multifunction device 4 capable of executing functions such as print, copy, scan, etc., and a terminal equipment 5 having a displaying portion and an operating portion and for inputting/outputting the information. Respective equipments are connected to communicate with each other via a network 8 respectively.

The organization information management server 2 stores user information 20 showing information concerning respective users every user, and organization information 21 showing the relation between the user and the organization.

The authentication service server 3 stores authentication card information 30 used to authenticate whether or not the information that is read from an authentication card 60 by an authentication card reading portion 4A, which is provided to the multifunction device 4, can be used. In this case, the authentication card 60 and the authentication card reading portion 4A execute the reading out and the reading of the information by RF-ID (Radio Frequency IDentification), for example.

The multifunction device 4 stores print data in document information such as word processor, spreadsheet, image, etc., which are printed in the terminal equipment 5 and received via the network 8, as a print job 40. Also, when the information of the authentication card 60 read by the authentication card reading portion 4A is authenticated, the multifunction device 4 prints the print job 40 associated with the authentication card 60 or validates the function such as copy, scan, or the like. That is, the multifunction device 4 enables the user to utilize these functions.

Also, the multifunction device 4 reads the certificate paper 7, on which an ID code 70 using QR (Quick Response) code (registered trademark), or the like is set forth, by using a scanning function, or the like. Thus, the multifunction device 4 makes the function such as print, copy, scan, or the like active to the user who utilizes the certificate paper 7. That is, the multifunction device 4 enables the user to utilize these functions.

In the present exemplary embodiment, for example, when a user 6A is not carrying the authentication card on account of the loss of the authentication card, or the like, and then requests a user 6B to print the certificate paper 7. Then, the user 6A explains a situation that the functions of printing, and the like in the multifunction device 4 are utilized by using the certificate paper 7.

FIG. 2 is a schematic view showing a configurative example of an authentication server according to the first exemplary embodiment of the present invention.

The certificate paper service server 1 includes a controlling portion 10 constructed by CPU (Central Processing Unit), or the like to control respective portions and execute various programs, a memory portion 11 constructed by a memory device such as HDD (Hard Disk Drive), flash memory, or the like to store information, and a communicating portion 12 constructed by a network interface card (NIC) to communicate with an external equipment via the network 8 such as LAN (Local Area Network), or the like.

When the controlling portion 10 executes a certificate paper service program 11A, such controlling portion 10 executes the functions as a UI generating unit 10A, an issuance request accepting unit 10B, an issuance deciding unit 10C, an issuance instructing unit 10D, a certificate paper information generating unit 10E, a certificate paper outputting unit 10F, and the like.

The UI (User Interface) generating unit 10A accepts the operation from the terminal equipment 5, and generates the contents responding to the operation contents as an operation screen (UI) displayed on a display portion provided to the terminal equipment 5 or a display portion provided to the multifunction device 4.

The issuance request accepting unit 10B accepts an issuance request of the certificate paper 7 based on the information that the user inputs the operation portion in accordance with the contents of the operation screen displayed on the terminal equipment 5.

The issuance deciding unit 10C decides whether or not the issuance should be permitted, based on the relation between the user who requests the issuance of the certificate paper 7 and the user who utilizes the certificate paper 7.

The issuance instructing unit 10D instructs the certificate paper information generating unit 10E, described later, to generate certificate paper information 11C, described later, based on the decision of the issuance deciding unit 10C.

The certificate paper information generating unit 10E generates the certificate paper information 11C described later, in response to the instruction that is accepted from the issuance instructing unit 10D.

The certificate paper outputting unit 10F converts the certificate paper information 11C generated by the certificate paper information generating unit 10E into a print job in the format that can be printed by the multifunction device 4, and outputs the print job to the multifunction device 4.

The memory portion 11 stores the certificate paper service program 11A used to operate the controlling portion 10 as respective unit described above, right information 11B for describing the rights for functions, which the multifunction device 4 utilizes by using the certificate paper 7, out of the functions that can be utilized by the multifunction device 4, and the certificate paper information 11C generated by the certificate paper information generating unit 10E.

FIGS. 3A and 3B are schematic views showing an example of information that the certificate paper service server according to the first exemplary embodiment of the present invention stores.

As shown in FIG. 3A, the right information 11B has rights such as copy, print, scan, etc., for example, as the functions that are authorized for the multifunction device 4 connected to the network 8 to utilize. The user cannot utilize the functions except the functions that are set forth in the right.

As shown in FIG. 3B, the certificate paper information 11C has information showing a certificate paper printing person indicating the user who requests to print the certificate paper 7, a certificate paper user indicating the user who utilizes the certificate paper 7, an ID code that is assigned uniquely every certificate paper 7, a right indicating the function that can be utilized by using the certificate paper 7, and a term indicating the term in which the user can utilize the multifunction device 4 based on the certificate paper 7.

FIGS. 4A and 4B are schematic views showing an example of information that an organization information management server according to the first exemplary embodiment of the present invention stores.

As shown in FIG. 4A, the user information 20 has information showing an ID that is assigned uniquely to the user respectively, and a user name indicating a user (user name).

The organization information 21 give the information indicating the predetermined relation between the user. As shown in FIG. 4B, the organization information 21 has information showing a person in right indicating the name of user who can request to issue the certificate paper 7, and a user name indicating the user who can utilize the certificate paper 7 that is printed in response to the request that the person in right issued. In this case, it is assumed that, when "all users" is labeled in the column of the user, the user who is defined in the user information 20 is chosen irrespective of the organic relation and such user can request to issue the certificate paper 7.

FIG. 5 is a schematic view showing an example of information that an authentication service server according to the first exemplary embodiment of the present invention stores.

The authentication card information 30 has information showing a card ID that is assigned uniquely to the authentication card 60, and a user name indicating the user name that is registered as the user name of the authentication card 60.

FIG. 6 is a schematic view showing an example of information that a multifunction device 4 according to the first exemplary embodiment of the present invention stores.

The print job 40 has either a user who executed the printing process of document information formed by the application such as a word processor, a spreadsheet soft, or the like in the terminal equipment 5 or a user who requests to issue the certificate paper 7 from the certificate paper service server 1, and either a printed document that is generated from the document information as the result of the printing process in the terminal equipment 5 and serves as a generation source of the print data received at the multifunction device 4 or a printed document indicating a document name of the certificate paper information used to print the certificate paper 7 that is received from the certificate paper service server 1.

FIGS. 7A and 7B are schematic views showing an example of a certificate paper printing screen that is displayed on a terminal according to the first exemplary embodiment of the present invention.

A certificate paper print screen 50A gives the UI that is displayed in the display portion of the terminal equipment 5. As shown in FIG. 7A, the certificate paper print screen 50A has one or more input boxes 500 into which a name of person in right who intends to print the certificate paper 7 and a password are input, and a select next button 501 that is used to go to a certificate paper print screen 50B to set other items after the contents being input into the input box 500 are decided.

A certificate paper print screen 50B gives the UI that is displayed next to the certificate paper print screen 50A. As shown in FIG. 7B, the certificate paper print screen 50B has a choice button 502 used to choose the user who utilizes the certificate paper 7, one or more choice buttons or check boxes 503 used to choose the function that the user can utilize by using the certificate paper 7, one or more choice buttons or input boxes 504 used to choose the term in which the certificate paper 7 is effective, and a print button 505 used to print the certificate paper 7 in the contents being set as above. In this case, the name of user who can print the certificate paper 7 as the person in right based on the organization information 21 is displayed in the choice button 502 as the choice. Also, the right that indicates the function based on the right information 11B is displayed in the choice button 503 as the choice.

(Operation)

An operation of the authentication system according to the exemplary embodiment of the present invention will be explained with reference to respective drawings hereunder.

First, when the user 6A is not carrying the authentication card on account of the loss of the authentication card that is associated with the user 6A, or the like, such user 6A requests the user 6B to print the certificate paper 7, for example, for the purpose of utilizing the multifunction device 4.

Then, the user 6B accesses the certificate paper service server 1 by using the terminal equipment 5, and causes the multifunction device 4 to print the certificate paper 7.

When the UI generating unit 10A accepts the issuance request of the certificate paper 7 from the user 6B via the terminal equipment 5, for example, such UI generating unit 10A generates the UI to display the certificate paper print screens 50A and 50B in order on the display portion of the terminal equipment 5, as shown in FIGS. 7A and 7B, and then transmits the UI to the terminal equipment 5.

An operation of the certificate paper service server 1 to execute the printing process of the certificate paper 7 will be explained hereunder.

Figure 8:
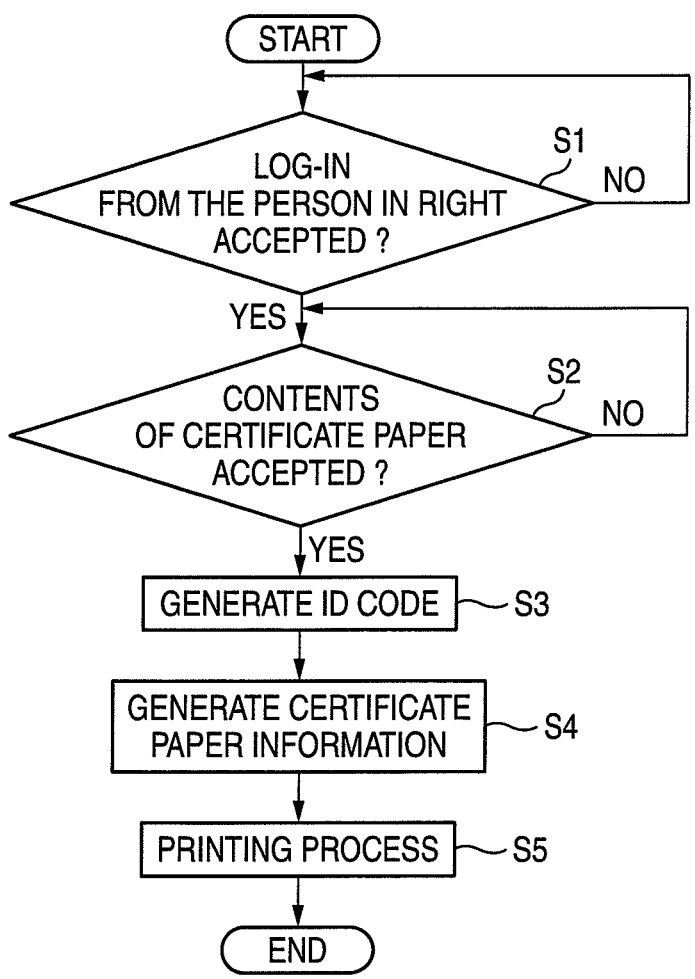
FIG. 8 is a flowchart showing an operational example of the certificate paper service server according to the first exemplary embodiment of the present invention.

FIG. 8 is a flowchart showing an operational example of the certificate paper service server according to the first exemplary embodiment of the present invention.

If the issuance request accepting unit 10B of the certificate paper service server 1 accepts the log-in from the user 6B as the person in right in the certificate paper print screen 50A (S1: Yes), such accepting unit 10B accepts the contents of certificate paper chosen by the operation of the user 6B in the choice buttons 502 to 504 on the certificate paper print screen 50B displayed on the display portion of the terminal equipment 5 (S2: Yes). If the accepted contents coincide with the organization information 21, the issuance deciding unit 100 instructs the issuance instructing unit 10D to generate the ID code decided uniquely (S3). The certificate paper information generating unit 10E generates the certificate paper information 11C based on the contents chosen in the choice buttons 502 to 504 under the instructions of the issuance instructing unit 10D (S4).

Then, the certificate paper outputting unit 10F executes the printing process, by printing the certificate paper information 11C generated in step S4 to generate the print data that is used to print the certificate paper 7, and then transmitting the print data to the multifunction device 4 (S5).

Then, the print data transmitted from the certificate paper service server 1 are stored in the multifunction device 4 as the print job 40.

Then, the user 6B causes the authentication card reading portion 4A to read the authentication card 60, and brings the multifunction device 4 into a usable state. Then, the user 6B executes the printing of the certificate paper 7 based on the print job 40, and thus the certificate paper 7 is printed.

The user A picks up the certificate paper 7, and causes the multifunction device 4 to scan the certificate paper 7 by utilizing the scanning function that needs no authentication to execute the authentication.

An operation of providing the function that the multifunction device 4 has when the multifunction device 4 reads the certificate paper 7 will be explained hereunder.

Figure 9:
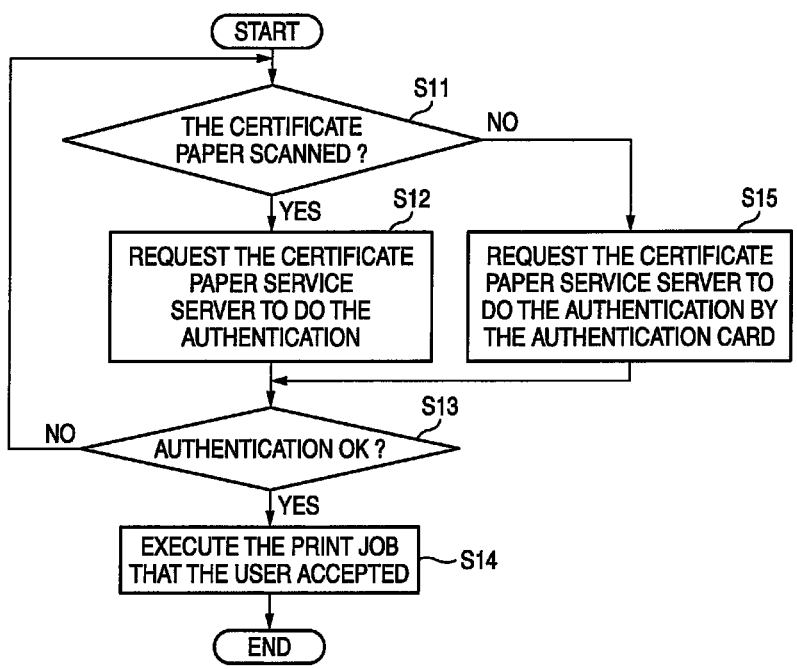
FIG. 9 is a flowchart showing an operational example of the multifunction device according to the first exemplary embodiment of the present invention.

FIG. 9 is a flowchart showing an operational example of the multifunction device 4 according to the first exemplary embodiment of the present invention.

First, if the multifunction device 4 accepts the scanning of the certificate paper 7 (S11; Yes), such multifunction device 4 requests the certificate paper service server 1 to do the authentication (S12). Here, the certificate paper service server 1 refers to the certificate paper information 11C, and extracts the information having the ID code that coincides with the ID code that the certificate paper 7 has. If the concerned information is extracted, the multifunction device 4 authenticates the user (S13; Yes), and executes the print job 40 that the user 6A transmits to the multifunction device 4 (S14). In this case, in step S14, not only the print job 40 can be executed but also the functions such as copy, scan, etc. of the multifunction device 4 contained in the rights that are set in the certificate paper 7 can be executed.

Also, if the printing of the certificate paper 7 is not executed (S11; No), the multifunction device 4 requests the certificate paper service server 3 to do the authentication by the authentication card (S15). An operation in step S15 is identical to the operation taken when the user 6B prints the certificate paper 7.

Also, if the user is not authenticated (S13; No), the process goes back to step S11.

Second Exemplary Embodiment

In a second exemplary embodiment, the medium that the user requests to issue the certificate paper is changed from the terminal equipment 5 to the multifunction device 4.

Figure 10:
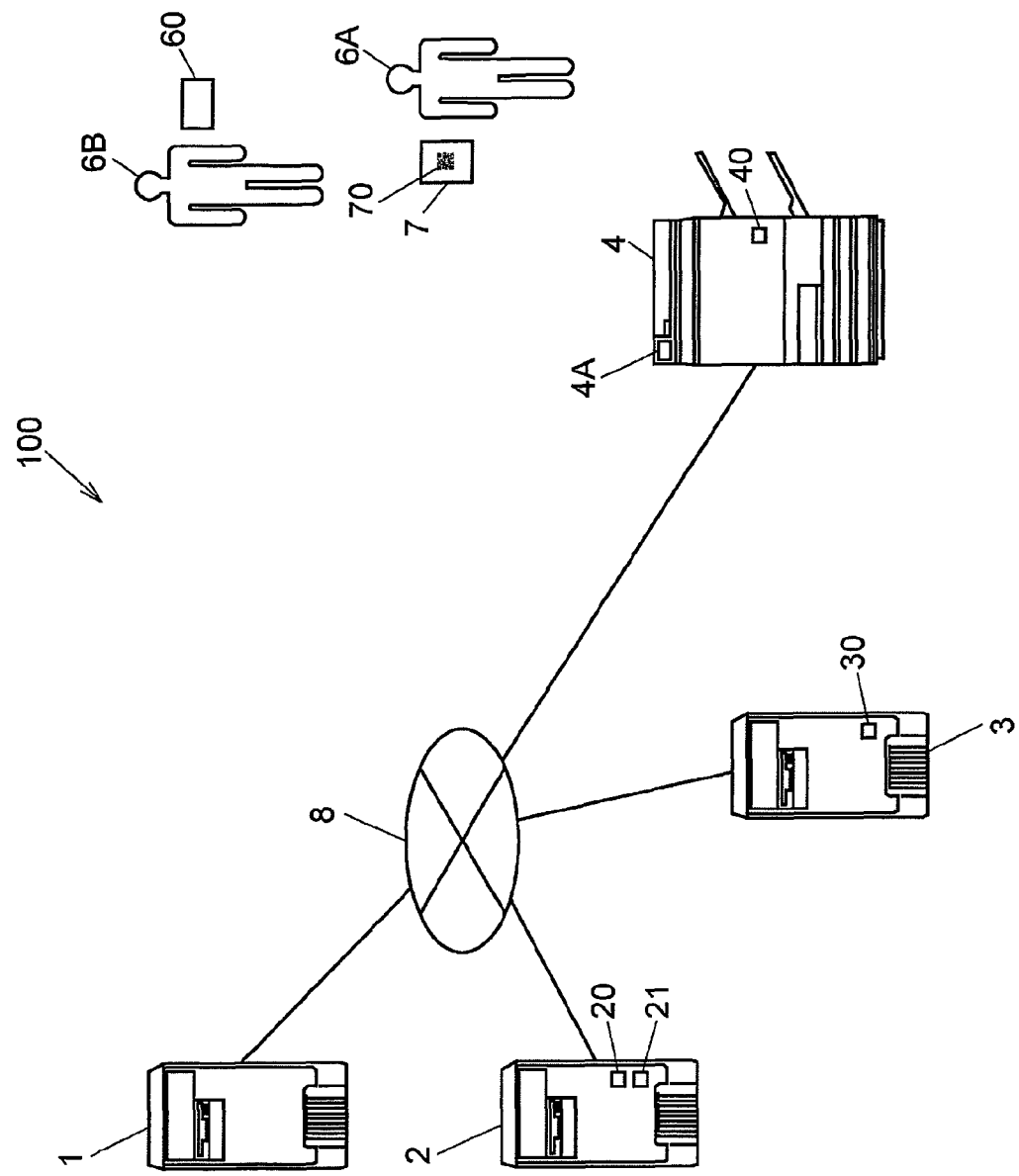
FIG. 10 is a schematic view showing a configurative example of an authentication system according to a second exemplary embodiment of the present invention.

FIG. 10 is a schematic view showing a configurative example of an authentication system according to a second exemplary embodiment of the present invention.

First, when the user 6A is not carrying the authentication card on account of the loss of the authentication card that is associated with the user 6A, or the like, such user 6A requests the user 6B to print the certificate paper 7, for example, for the purpose of utilizing the multifunction device 4.

Then, the user 6B accesses the certificate paper service server 1 by using the multifunction device 4, and causes the multifunction device 4 to print the certificate paper 7.

When the UI generating unit 10A accepts the issuance request of the certificate paper 7 from the user 6B via the operation on the menu screen of the multifunction device 4, for example, such UI generating unit 10A generates the UI to display the certificate paper print screens 50A and 50B in order on the display portion of the multifunction device 4, as shown in FIGS. 7A and 7B, and then transmits the UI to the terminal equipment 5. Subsequent operations are similar to those in the first exemplary embodiment.

Third Exemplary Embodiment

A third exemplary embodiment is varied such that the user 6A requests the multifunction device 4 to issue the certificate paper 7.

Figure 11:
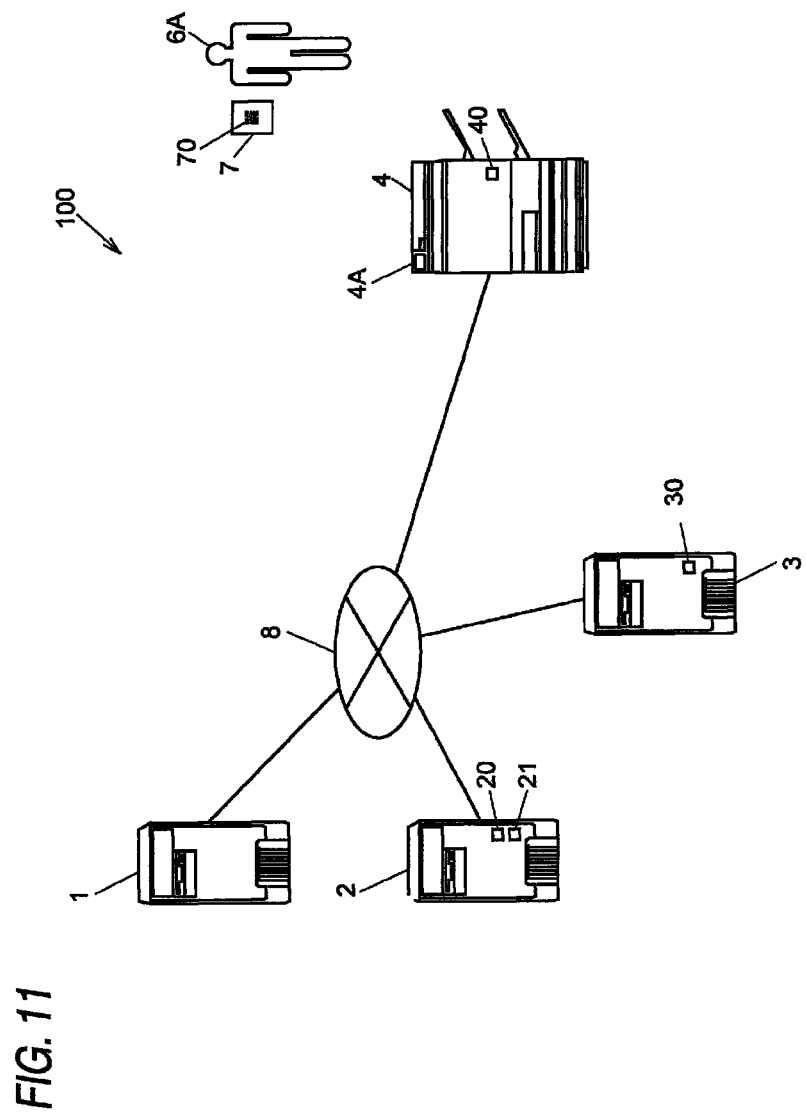
FIG. 11 is a schematic view showing a configurative example of an authentication system according to a third exemplary embodiment of the present invention.

FIG. 11 is a schematic view showing a configurative example of an authentication system according to a third exemplary embodiment of the present invention.

First, when the user 6A is not carrying the authentication card on account of the loss of the authentication card that is associated with the user 6A, or the like, such user 6A accesses the certificate paper service server 1 by using the multifunction device 4 for the purpose of utilizing the multifunction device 4, and causes the multifunction device 4 to print the certificate paper 7. At this time, the authentication needed to access the certificate paper service server 1 is executed by using the operating portion of the multifunction device 4 or the inputting unit such as software keyboard, or the like displayed on the display portion. In this case, in the third exemplary embodiment, there is such a necessity that both the person in right in the organization information 21 and the user name are set to the same person (user 6A).

The subsequent operations are similar to those in the first exemplary embodiment.

Fourth Exemplary Embodiment

A fourth exemplary embodiment is varied such that the ID code is displayed on the mobile terminal 9 not to use the certificate paper 7.

Figure 12:
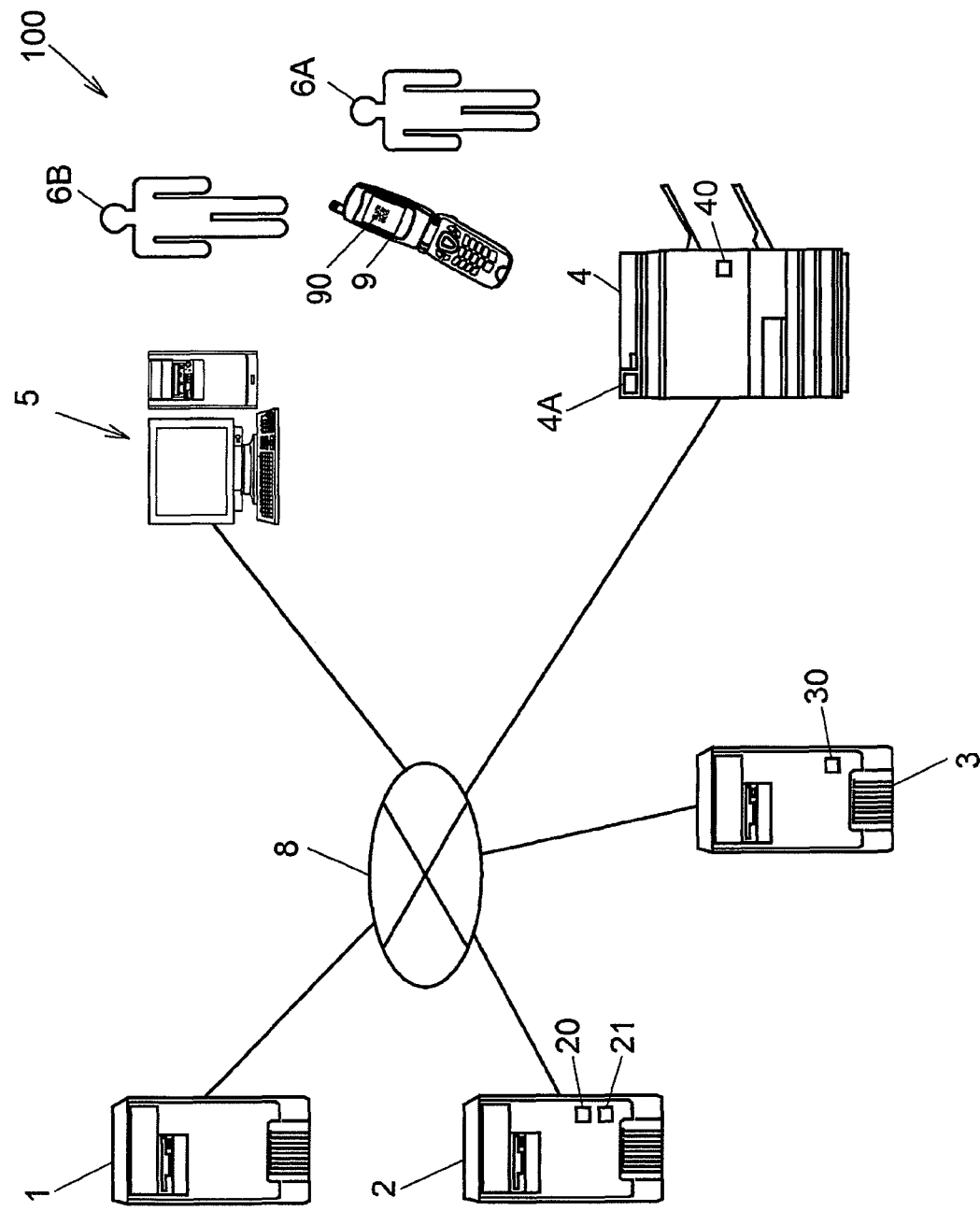
FIG. 12 is a schematic view showing a configurative example of an authentication system according to a fourth exemplary embodiment of the present invention.

FIG. 12 is a schematic view showing a configurative example of an authentication system according to a fourth exemplary embodiment of the present invention.

First, when the user 6A is not carrying the authentication card on account of the loss of the authentication card that is associated with the user 6A, or the like, such user 6A requests the user 6B to acquire the ID code 90, for example, for the purpose of utilizing the multifunction device 4.

Then, the user 6B accesses the certificate paper service server 1 by using the terminal equipment 5, and causes the certificate paper service server 1 to transmit the ID code 90 to the mobile terminal 9.

When the UI generating unit 10A accepts the transmission request of the ID code 90 from the user 6B via the terminal equipment 5, for example, such UI generating unit 10A generates the UI to display the certificate paper print screens 50A and 50B in order on the display portion of the terminal equipment 5, as shown in FIGS. 7A and 7B, and then transmits the UI to the terminal equipment 5, like the first exemplary embodiment.

Then, the certificate paper information generating unit 10E generates the certificate paper information 11C based on the contents chosen in the certificate paper print screens 50A and 50B. The certificate paper outputting unit 10F not generates the print data but generates the display data that the mobile terminal 9 can recognize, and transmits the display data to the mobile terminal 9.

The mobile terminal 9 receives the display data by utilizing the communication network, or the like of the cellular phone, and displays the data on the display portion as the ID code 90. The user 6A executes the authentication by causing the multifunction device 4 to read the ID code 90 displayed on the mobile terminal 9.

In this case, any type of the equipment used to display the ID code 90 may be employed in addition to the mobile terminal 9 if such equipment can display the ID code 90 such as the electronic paper, or the like.

Other Exemplary Embodiment

Here, the present invention is not limited to the above exemplary embodiment, and various variations can be applied within a scope that does not depart from a gist of the present invention. For example, a configuration for reporting the used histories, or the like of the multifunction device 4 of the user who used the certificate paper 7 to the user 6B who issued the certificate paper 7 may be added. Also, the certificate paper 7 may be constructed such that this certificate paper can be authenticated by any multifunction device that is connected to the certificate paper service server 1, except the multifunction device 4. Also, the certificate paper service server 1 may manages a list of the ID codes of the certificate papers that are decides as invalid, then refer to the list of the invalid ID codes upon doing the authentication, and then do not authenticate the certificate paper when the ID code coincides with the ID codes cited on the list.

Also, the UI generating unit 10A, the issuance request accepting unit 10B, the issuance deciding unit 10C, the issuance instructing unit 10D, the certificate paper information generating unit 10E, and the certificate paper outputting unit 10F used in the above exemplary embodiment may be caused to function when the computer program stored in the memory medium such as CD-ROM, or the like is read into the memory portion in the equipment and then the computer program is executed. Also, the computer program may be downloaded into the memory portion in the equipment from the server equipment, or the like connected to the network such as the Internet, or the like. Also, a part or all of the unit used in the above exemplary embodiment may be implemented by the hardware such as Application-Specific Integrated Circuit (ASIC), or the like. Also, the memory medium that stores the computer program may be provided, or the computer program may be distributed via the network such as the Internet, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication system comprising:
   an output device having an output function and at least a part of a first authentication function of authenticating a first user using an ID card and enabling the first user authenticated by using the ID card to utilize the output function; and
   an authentication apparatus which is communicably connected to the output device via a network, the authentication apparatus including:
      an accepting unit configured to accept, from the first user authenticated by inputting text information which includes at least identification information of the first user, a request to cause the output device to output an authentication information for a second user; and
      an instructing unit configured to send, to the output device, an instruction to cause the output device to output the authentication information when the accepting unit accepts the request,
   wherein the output device outputs the authentication information when authenticating the first user using the ID card after receiving the instruction from the instructing unit of the authentication apparatus, and wherein the output device further having at least a part of a second authentication function of authenticating the second user by scanning the outputted authentication information.

2. The authentication system according to claim 1, wherein the output function of the output device is a print function of printing the authentication information for the second user on a certification paper, wherein the authentication apparatus further includes: a generating unit configured to generate print data of the authentication information when the accepting unit accepts the request, and wherein the instructing unit is configured to send, to the output device, the print data generated by the generating unit together with the instruction.

3. The authentication system according to claim 1, wherein the output function of the output device is a display function of displaying the authentication information for the second user on a screen of the output device, wherein the authentication apparatus further includes a generating unit configured to generate display data of the authentication information when the accepting unit accepts the request, and wherein the instructing unit sends, to the output device, the display data generated by the generating unit together with the instruction.

4. The authentication system according to claim 1, wherein the output device includes: a reading unit that reads an authentication information for the ID card to realize the first authentication function of authenticating the first user; and a scanning unit that scans the authentication information for the second user to realize a second authentication function of authenticating the second user.

5. The authentication system according to claim 1, wherein the authentication apparatus further includes: a memory storing user information; and a deciding unit configured to decide whether to allow or refuse the request based on the user information stored in the memory and the first user authenticated by using the inputted text information when the accepting unit accepts the request, and wherein the instructing unit is configured to send the instruction to the output device when the request is allowed by the deciding unit and not to send the instruction to the output device when the request is refused by the deciding unit.

6. The authentication system according to claim 1, further comprising a terminal device which is communicably connected to the authentication apparatus via the network, the terminal device having an authentication function of authenticating the first user using the inputted text information and a communicating function of sending the request to the authentication apparatus from the first user.

7. An authentication method for an authentication system that comprises:
an output device having an output function and at least a part of a first authentication function of authenticating a first user using an ID card and enabling the first user authenticated by using the ID card to utilize the output function; and
an authentication apparatus which is communicably connected to the output device via a network, the authentication method comprising:
accepting, by the authentication apparatus, from the first user authenticated by inputting text information which includes at least identification information of the first user, a request to cause the output device to output an authentication information for a second user;
sending, from the authentication apparatus to the output device, an instruction to cause the output device to output the authentication information when accepting the request;
authenticating, by the output device, the first user using the ID card after receiving the instruction from the authentication apparatus; and
outputting, by the output device, the authentication information when the first user is authenticated by using the ID card after the first user is authenticated,
wherein the output device further having at least a part of a second authentication function of authenticating the second user by scanning the outputted authentication information.

8. A non-transitory computer readable medium storing a program causing a computer to execute an authentication method for an authentication system that comprises:
an output device having an output function and at least a part of a first authentication function of authenticating a first user using an ID card and enabling the first user authenticated by using the ID card to utilize the output function; and
an authentication apparatus which is communicably connected to the output device via a network, the authentication method comprising:
accepting, by the authentication apparatus, from the first user authenticated by inputting text information which includes at least identification of the first user, a request to cause the output device to output an authentication information for a second user;
sending, from the authentication apparatus to the output device, an instruction to cause the output device to output the authentication information when accepting the request;
authenticating, by the output device, the first user using the ID card after receiving the instruction from the authentication apparatus; and
outputting, by the output device, the authentication information when the first user is authenticated by using the ID card after the first user is authenticated,
wherein the output device further having at least a part of a second authentication function of authenticating the second user by scanning the outputted authentication information.

* * * * *